W. E. GRAY & R. F. GOECKE.
PIPE COUPLING.
APPLICATION FILED APR. 22, 1914.

1,179,091.

Patented Apr. 11, 1916.

Witnesses
John S. Richey
Mela M. Smith

Inventors
William E. Gray &
Rudolf F. Goecke
By J. O. Richey
Their Attorney

UNITED STATES PATENT OFFICE.

WILLIAM E. GRAY AND RUDOLF F. GOECKE, OF ELYRIA, OHIO.

PIPE-COUPLING.

1,179,091. Specification of Letters Patent. Patented Apr. 11, 1916.

Application filed April 22, 1914. Serial No. 833,602.

*To all whom it may concern:*

Be it known that we, WILLIAM E. GRAY, a citizen of the United States, residing at Elyria, Lorain county, Ohio, and RUDOLF F. GOECKE, a subject of the Emperor of Germany, residing at Elyria, Lorain county, Ohio, have invented a certain new and useful Improvement in Pipe-Couplings; and we do hereby declare the following to be a clear and exact description of the invention, such as will enable others skilled in the art to which it appertains to make and use the same.

Our invention relates to means for efficiently connecting sections of enameled pipe, including any form of fittings such as T's, elbows, crosses, Y's, etc. The general aim of the invention being to improve such connections, in order to better preserve the enamel, to prevent weakening or breaking the same and at the same time to closely and efficiently close the joint between the sections of the pipe.

One of the particular objects of our invention is to join the sections with a substantially, uniformly distributive pressure, thus eliminating bending moments which subject the enamel to a strain.

Another particular object of our invention is to provide connecting means, such that thinner flanges can be employed upon the pipe sections and that such flanges may be made integral with the pipe.

Other objects of our invention and the invention itself will probably be better understood from a description of an embodiment thereof.

Figure 1:
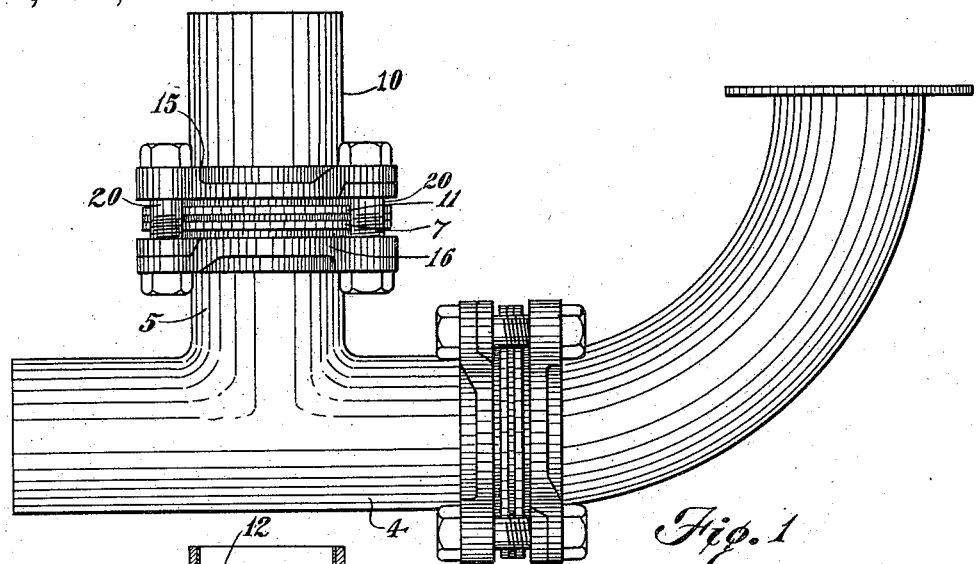
Figure 2:
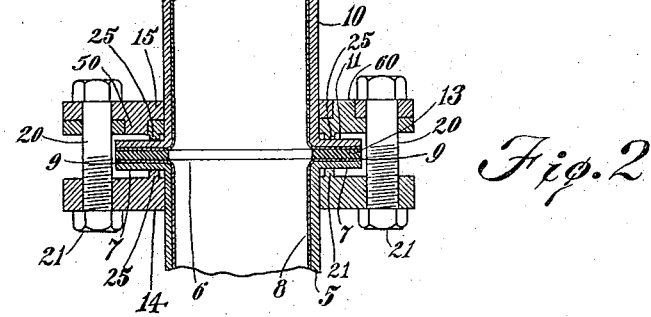
Figure 3:
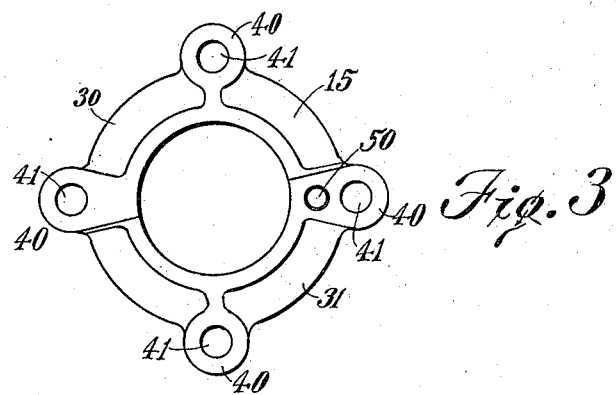

Figure 1, of the drawing is a side elevation of a section of pipe illustrating an embodiment of our invention. Fig. 2 is a section of a portion of the apparatus, illustrated in Fig. 1. Fig. 3, is a view of details.

Referring now to the drawing and to the embodiment of our invention there illustrated, at 4, is shown a section of pipe having an arm 5, which terminates at 6. The end 6, is turned outward to form a flange 7, preferably integral therewith, annular in shape and substantially at right angles to the sides of the pipe. The enamel is shown at 8, extending over the flange 7, as shown at 9. A second section of pipe is shown at 10, provided with a substantially similar flange 11 and enameled as shown at 12. The sections of pipe are connected by placing the flanges together, preferably with a compressible gasket 13, therebetween. The gasket is made of some suitable material such as rubber or fabric and is best made annular in shape and substantially of the same width as the length of the flange.

Suitable means are provided for clamping the flanges and the gasket together with substantially, uniformly distributed pressure. In the form shown, we have shown a set of clamping means, which, when assembled, extend around the pipe as shown. Members 14 and 15 are applied, one on each side of the joint and drawn together by suitable means such as bolts 20, provided with nuts 21. In order to reduce or eliminate the bending moments which might be exercised upon the flange by the clamping means, we apply the clamping pressure as close as possible to the walls of the pipe. In the form shown this is accomplished by providing an annular rib 25 on each of the clamping members, which are opposite each other and close up against the walls of the pipe when the parts are assembled.

The members 14 and 15 may be made in two pieces 30 and 31 (see Fig. 3), each substantially semicircular and each provided with three projections 40, which are perforated as shown at 41 for the bolts; one end of each of these members provided with a male member 50 and the other end with a female member 60 adapted to coöperate with each other to join the parts together.

By providing means for distributing the pressure we make a tighter connection, we distribute the pressure on the enamel preventing straining, local flexure or cracking of the same, we prevent the gasket or portions thereof, being blown out between isolated points of application of clamping pressure, we are enabled to use a thinner flange, thus being enabled to form the same, from the material of the pipe. The flange being of about the same thickness as the body of the pipe, the two parts cool off uniformly, thus preventing putting the enamel under strain or cracking the same from unequal contraction and expansion of these parts.

Other objects of our invention will be apparent to those skilled in the art.

We have illustrated this embodiment, not that we are limited to the details thereof, but to better describe the nature thereof. We contemplate modifications within the scope of the claims.

We claim:

1. In a device of the class described, the combination of two sections of pipe, a layer of enamel on said pipe, an enameled flange integral with each section and substantially at right angles to the axes of the pipe, an annular gasket between the flanges and an annular clamping means for clamping said flanges and gasket together, said clamping means including a pair of clamps an annular rib on each clamp extending around the body of the pipe, said ribs when in clamping position being in juxtaposition to each other and clamping said parts together with a uniformly distributive shearing force and means to draw said clamps together.

2. In a device of the class described, the combination of two sections of pipe, a flange of substantial area on each section and at right angles to the pipe, a layer of enamel on said pipe sections and said flanges, a gasket between the flanges, annular clamping means for clamping said flanges and gasket together, said clamping means including a pair of clamps, an annular rib on each clamp extending around the body of the pipe, said ribs when in clamping position being in juxtaposition to each other and clamping said parts together with a uniformly distributive shearing force and means to draw said clamps together.

3. In a device of the class described, the combination of two sections of enameled pipe having their ends applied to each other, clamping means for clamping the ends of the sections together and an annular rib on each section applied to the outside of the pipe through which the clamping pressure is uniformly distributed over a large area of the enameled pipe.

In witness whereof we have affixed our signatures in the presence of two witnesses this 17th day of April, 1914.

WILLIAM E. GRAY.
RUDOLF F. GOECKE.

Witnesses of both signatures:
F. O. RICHEY,
JOHN S. RICHEY.

Copies of this patent may be obtained for five cents each, by addressing the "Commissioner of Patents, Washington, D. C."